3,331,890
STERICALLY HINDERED SEGMENTED COPOLY-
ESTERS BASED ON POLYETHYLENE TEREPH-
THALATE
John R. Caldwell and Russell Gilkey, Kingsport, Tenn.,
assignors to Eastman Kodak Company, Rochester,
N.Y., a corporation of New Jersey
No Drawing. Filed May 6, 1963, Ser. No. 278,393
12 Claims. (Cl. 260—860)

This application is a continuation-in-part of Ser. No. 796,198 filed Mar. 2, 1959, now abandoned. The invention relates to novel segmented linear condensation-type copolyesters melting at high temperatures and having sterically hindered constituents.

The preparation of block copolyesters is rather generally known and can be accomplished by various means.

An object of this invention is to provide novel segmented copolyesters that contain hard and soft segments of two different polyesters in the same molecular chain by means of a novel process, said segmented copolyester being characterized by having a melting point within about 20° C. of the melting point of a homopolyester of the hard segment having a molecular weight above 10,000, and further characterized by being so stable in its molten form that after one hour the melting point has not decreased by more than 15° C. and is not less than about 235° C.

A further object of this invention is to provide an improved method for preparing segmented copolyesters which will have improved dyeability and certain other improved properties without deleteriously lowering the melting point as compared to previously known copolyesters having random or mixed structures.

A further object of the invention is to provide a new type of segmented polyesters in which alterations in the molecular structure are minimized during extended periods of heating necessitated by processing operations and under various conditions of use such as various electrical applications, fabricating operations such as spinning and molding, etc.

Other objects of this invention will become apparent elsewhere in the specification.

According to this invention, there is provided a process for preparing a linear condensation-type copolyester melting at above 200° C. and having a segmented structure wherein adjacent segments are composed of two different polyester moieties, at least one of which is essentially composed of repeating units as described in the above-identified parent application wherein a number of specific structures are depicted. In the parent application it is stated that the average molecular weight of the moieties is from about 4,000 to about 10,000, said moieties being connected by ester linkages and the ends of the polyester molecules being carboxy and hydroxy radicals, the average molecular weight of said segmented copolyester molecules being from about 10,000 to about 100,000, said process comprising the following steps: (A) forming a mixture of (I) from about 5 to 40 percent (preferably 10-30) by weight of a sterically hindered homopolyester composed of repeating units having a formula selected from any of those described in said parent application terminated with carboxy and hydroxy radicals with (II) from about 95 to 60 (preferably 90-70) percent by weight of a different homopolyester having a melting point of from about 200° C. to about 350° C. selected from the group consisting of a homopolyester as defined in (I) and a linear condensation-type homopolyester having an average molecular weight of from 4,000 to 10,000 melting at from about 200° C. to about 350° C.

As described in said parent application, the mixture of homopolyesters can be prepared in the form of solid particles by forming under an inert atmosphere a melt of one of the homopolyesters defined as (I) and (II) above, adding the other different homopolyester to the melt, stirring until a uniformly blended melt is obtained, and comminuting to form solid particles. Another process described in the parent application comprises preparing a mixture of homopolyesters in the form of solid particles for use in the process described above. This process includes the steps of forming a solution of one of the homopolyesters defined as (I) and (II) above in a solvent, mixing the solution with particles of the other different polyester to form uniformly moistened particles of mixed homopolyesters, and evaporating the solvent.

These two techniques for forming the mixture of homopolyesters in the form of solid particles give advantageous results in practicing the present invention.

It is apparent that the description of the invention as already given in the parent application is adequate to teach those persons skilled in the art to which this invention pertains how to practice the invention. Such persons are quite well aware of the various techniques for preparing the homopolyesters and determining the molecular weights thereof. Reference is made to the great number of examples presented in the parent application which serve to clarify any minor details as to how this invention can be practiced. Little point is seen in indulging in a lengthy reiteration of techniques which would add nothing to the understanding of this invention.

It is to be noted that the segmented copolyesters of this invention include at least one component which contains a sterically hindered structure. By practicing the process of this invention, advantage is taken of the steric configuration so as to accomplish novel results in accordance with the discovery of the inventors. The process of the invention is valuable for a great number of objectives such as in modifying high-melting crystalline polyesters to improve the dyeing properties without substantially lowering the melting point. The process is also valuable for improving such physical properties as elongation, impact strength, hardness and other properties.

It has been discovered that the novel concept embodied in the present invention allows the relative reaction rates to be controlled by the steric configuration of the acid and glycol components of the polyester. In accordance with this discovery it has been found that the polyester segments made from certain types of glycols and acids have such a slow rate of ester-interchange that they will retain their identity under relatively severe conditions and yet they will at the same time react at the ends of the chains so as to form a high molecular weight segmented copolyester. The high molecular product shows practically no chain fission under ordinary processing conditions. It is believed quite unobvious that low molecular weight homopolyesters which can be employed in accordance with the process of this invention could be condensed to produce the advantageous products obtained.

Based upon further discoveries since the parent application was filed it has now been found that the invention is somewhat more broad in some respects than originally disclosed as briefly reviewed hereinabove. Hence this is one of at least two continuation-in-part applications which will cover segmented copolyesters wherein the hard segment in one case is polyethylene terephthalate, in another case it is poly(1,4-cyclohexylenedimethylene terephthalate) and a third case is contemplated wherein the hard segment is poly(ethylene naphthalenedicarboxylate) in its various isomeric forms, especially the 2,6-isomer.

According to the present invention there is provided a segmented linear condensation-type copolyester melting between about 240° C. and 265° C. having a molecular weight of at least about 10,000 and having a segmented structure essentially composed of from about 95 to 60 percent by weight of hard segments and from about 5 to 40% by weight of soft segments in alternating sequence connected by ester linkages, said hard segments being composed of polyethylene terephthalate having an average molecular weight of at least 4,000 up to about 40,000 and said soft segments being composed of a homopolyester having an average molecular weight of about 1,500 up to about 25,000, said homopolyester being composed of at least one sterically hindered constituent, said constituents of said homopolyester being selected from the group of polyester constituents consisting of (1) $HO-(CH_2)_r-X-(CH_2)_r-OH$
(2) $HO-OC-Y-CO-OH$, and
(3) $HO-CH_2-Z-CO-OH$ where $r$ is from zero to 1 and wherein X, Y and Z each represents a divalent organic radical containing from 1 to 40 carbon atoms, from zero to 4 chlorine atom substituents, from zero to 4 bromine atom substituents, from zero to 20 oxygen atoms present as ether linkages and sufficient hydrogen atoms to provide a radical free from acyclic ethylenic unsaturation, the divalent radical of said sterically hindered constituent being limited to the following radicals:

(a) 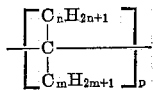

where each of $m$, $n$ and $p$ is from 1 to 4, (b) A cycloalkylene radical containing from 4 to 10 carbon atoms in the carbocyclic ring having from zero to one unsaturated linkage between the nuclear carbon atoms, (c) A bicycloheptylene radical having from zero to one unsaturated linkage between the nuclear carbon atoms, said segmented copolyester being characterized by having a melting point within about 20° C. of the melting point of a homopolyester of the hard segment having a molecular weight above 10,000, and further characterized by being so stable in its molten form that after one hour the melting point has not decreased by more than 15° C. and is not less than about 235° C.

In brief, the process of the invention involves heating and mixing for at least 15 minutes a mixture of two homopolyesters having different compositions under a vacuum or an inert atmosphere with the temperature somewhat above or below the melting point of the higher melting polyester depending upon whether solid phase or melt phase polymerization is employed. One or both of the species of homopolyesters must contain a component that has a sterically hindered structure. During the heating process the two different species of homopolyesters react at their ends to produce long chain polymers that contain alternating segments of the species. These segments retain their identity when the copolyester is melted for spinning, molding, extruding, etc. Moreover, these segments retain their identity and the copolyester is unusually stable in a great variety of applications such as in electrical insulators, dielectrics for condensers, fabrics being used in industrial applications at high temperatures, etc.

According to one embodiment of the process of this invention there is provided a process for preparing a segmented linear condensation-type copolyester melting between about 240° C. and 265° C. comprising the following steps:

(A) Forming a molten mixture of hard segment component (I) and soft segment component (II) as follows:

(I) From about 95 to 60% by weight of polyethylene terephthalate having an average molecular weight of from about 4,000 to about 100,000, (II) From about 5 to 40% by weight of a homopolyester having an average molecular weight of about 1,500 up to about 25,000, said homopolyester being composed of at least one sterically hindered constituent, said constituents of said homopolyester being selected from the group of polyester constituents consisting of (1) $HO-(CH_2)_r-X-(CH_2)_r-OH$
(2) $HO-OC-Y-CO-OH$, and
(3) $HO-CH_2-Z-CO-OH$ where $r$ is from zero to 1 and wherein X, Y and Z each represents a divalent organic radical containing from 1 to 40 carbon atoms, from zero to 4 chlorine atom substituents, from zero to 4 bromine atoms substituents, from zero to 20 oxygen atoms present as ether linkages and sufficient hydrogen atoms to provide a radical free from acrylic ethylenic unsaturation, the divalent radical of said sterically hindered constituent being limited to the following radicals:

(a) 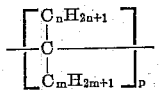

where each of $m$, $n$ and $p$ is from 1 to 4, (b) A cycloalkylene radical containing from 4 to 10 carbon atoms in the carbocyclic ring having from zero to one unsaturated linkage between the nuclear carbon atoms, (c) A bicycloheptylene radical having from zero to one unsaturated linkage between the nuclear carbon atoms, (B) Heating said mixture at a temperature of from about 220° C. to about 300° C. until said segmented copolyester is formed, said segmented copolyester being characterized by having a melting point within about 20° C. of the melting point of a homopolyester of the hard segment having a molecular weight above 10,000, and further characterized by being so stable in its molten form that after one hour the melting point has not decreased by more than 15° C. and is not less than about 235° C.

A great number of components which have sterically hindered structures and which can be used in preparing polyesters are known in the art and only a few examples need to be given for illustrative purposes. Such components and others which can also be used include the following.

Suitable glycols that contain the neopentyl structure are: 2,2-dimethyl-1,3-propanediol; 2-methyl-2-ethyl-1,3-propanediol; 2,2-dibutyl-1,3-propanediol; 2,2,3,3-tetramethyl-1,4-butanediol, etc.

Glycols containing an alicyclic structure are represented by: quinitol; 1,1-, 1,2-, 1,3-, and 1,4-cyclohexanedimethanol; 2,2-, 2,5-, and 2,6-bicycloheptanedimethanol; 1,3-cyclopentanedimethanol, 2,2,4,4-tetramethyl-1,3-cyclobutanediol, etc.

Suitable acids that contain the neopentyl structure include: dimethylmalonic acid; methylethylmalonic acid; diethylmalonic acid; tetramethylsuccinic acid, etc.

Suitable acids that contain alicyclic structures are: 1,1-, 1,2-, 1,3- and 1,4-cyclohexanedicarboxylic acids; 4-cyclohexene-1,2-dicarboxylic acid; 2,2-, 2,5- and 2,6-bicycloheptanedicarboxylic acids; bicyclo(2,2,1)-5-heptene-2,3-dicarboxylic acid; hydrogenated 4,4'-dibenzoic acid, etc.

Suitable hydroxyacids that contain the neopentyl structure are: hydroxypivalic acid; 2-methyl-2-ethyl-3-hydroxypropionic acid; 5,5-dimethyl-6-hydroxy-hexanoic acid, etc.

Suitable hydroxyacids that contain the alicyclic structure are: 1-hydroxymethyl-1-carboxycyclohexane and the related 1,2-, 1,3- and 1,4-derivatives; 3-hydroxycyclohexanecarboxylic acid; 5-hydroxymethyl-2-carboxybicycloheptane, etc.

In a preferred embodiment of the invention, one of the polyester species contains a sterically hindered acid and a sterically hindered glycol. Suitable combinations include: 2,2-dimethyl-1,3-propanediol and 1,4-cyclohexanedicarboxylic acid; 1,3-cyclohexanedimethanol and 1,3-cyclohexanedicarboxylic acid; 2,2-dimethyl-1,3-propanediol and 1,2-cyclohexanedicarboxylic acid; 2-methyl-2-ethyl-1,3-propane-diol and 2,5-bicycloheptanedicarboxylic acid; 2,2-dimethyl-1,3-propanediol and 2,2-dimethyl malonic acid; and others as illustrated in the examples below.

The homopolyesters of hydroxypivalic acid and hydroxymethylcyclohexanecarboxylic acids are of particular value because the hydroxyl group and carboxyl group both are strongly hindered or blocked.

Two methods of forming particles of blended polyesters have been described in the parent application as the melt method and the slurry or impregnation method.

The preparation of the homopolyesters for the hard and soft segments broadly involves the condensation of bifunctional reactants in the presence of a catalyst so as to produce a polyester of the desired molecular weight. One method for determining molecular weight involves measuring the inherent viscosity (I.V.) in a solvent such as 60% phenol-40% tetrachloroethane. As regards the hard segment homopolyester a preferred range of I.V. is 0.5 to 0.7 although a range of 0.3 to 1.0 is useful and the range can be extended to from about 0.2 to 1.5. The range of molecular weights given hereinabove is considered more definitive than the I.V. range for both hard and soft segment homopolyesters. The I.V. range for the latter is not practical to measure as regards molecular weights of about 1,500 to about 2,500 or somewhat higher.

The segmented copolyesters of this invention generally have inherent viscosities of at least 0.6 and they may range as high as 2.5 or higher although it is generally satisfactory to employ segmented copolyesters for most purposes which have inherent viscosities from about 0.6 to about 1.2.

When the homopolyester is being prepared from a hydroxy carboxy compound only one bifunctional compound is employed in the reaction whereas when it is being prepared from a dicarboxy compound and a glycol it is necessary to have both compounds present with the glycol usually being employed in stoichiometric excess using any of the known techniques for polymerization. One advantageous technique involves the use of a lower alkyl ester of the bifunctional carboxy compound. The condensation is facilitated by a catalyst at an elevated temperature such that the condensation proceeds at a satisfactory rate to achieve the desired molecular weight. The methods used for preparing the homopolyester do not constitute any part of the present invention. Such methods are well known in the art and set forth in numerous patents and in the literature.

The polyester constituents employed according to this invention are bifunctional reactants, which term is well known in the art pertaining to linear polyesters and was first used by Carothers a great number of years ago in describing the reactants which must be used in the preparation of linear polyesters and other linear condensation-type polymers. This term clearly restricts the compounds so designated so as to make it apparent that they contain no other reactants which might cause any significant cross linking or other side reactions.

The various examples given in the parent application serve to illustrate various homopolyesters which can be used in the process of the invention. It is not believed necessary to repeat these examples in the present application.

These specifically-described, sterically-hindered homopolyesters of the parent application and others similar thereto are characterized by their relatively slow ester interchange and molecular weight buildup. Consequently, they are not very susceptible to cleavage and rearrangement to random copolymers when heated with other species of polyesters under polymerization conditions. This is especially true in solid-phase polymerization. They have melting or softening points ranging from room temperature up to over 300° C. However, quite surprisingly, the melting point of the final segmented copolyester is only slightly depressed regardless of the melting point of the sterically-hindered segment.

The following examples of specific embodiments of this invention will serve to further illustrate preferred embodiments of this invention. In these examples the repeating units of the homopolyesters are shown where the value of $n$ is the average value appropriate for the particular molecular weight which corresponds to the I.V.

The following polymers were prepared by known procedures using the dicarboxylic esters and diols.

(A) Polypivalolactone
Inherent viscosity=0.32

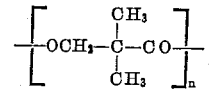

(B) Poly-2,2-dimethyl-1,3-propylene - 2,2 - dimethylmalonate
Inherent viscosity=0.15

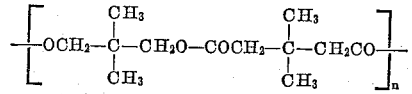

(C) Poly-2-methyl-2-ethyl-1,3 - propylene - norcamphane-2,5-dicarboxylate
Inherent viscosity=0.48

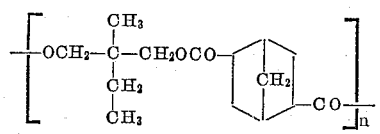

(D) Poly-2,2-diethyl-1,3 - propylene - 1,4 - cyclohexanedicarboxylate
Inherent viscosity=0.63

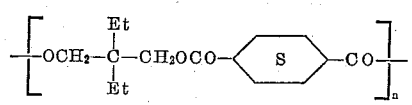

(E1) Poly-1,2-cyclohexylenedimethylene - 1,4 - cyclohexanedicarboxylate
Inherent viscosity=0.64

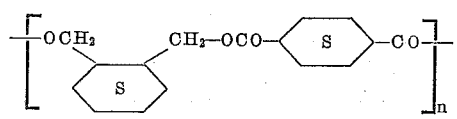

(E2) Poly-1,4-cyclohexylenedimethylene - 1,4 - cyclohexanedicarboxylate
Inherent viscosity=0.39

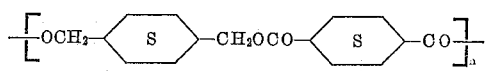

(F) Poly-1,2-cyclohexylenedimethylene - 1,2 - cyclohexanedicarboxylate
Inherent viscosity=0.65

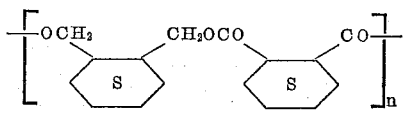

(G) Poly-1,2-cyclohexylenedimethylene terephthalate
Inherent viscosity=0.50

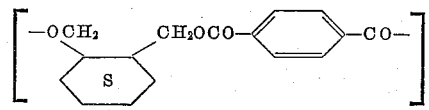

(H) Poly-2,2,4,4-tetramethyl - 1,3 - cyclobutylene - 1,4-cyclohexanedicarboxylate
Inherent viscosity=0.29

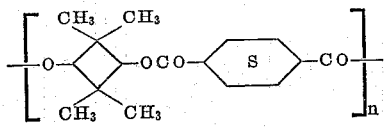

(I) Poly-2,2,4,4-tetramethyl-1,3 - cyclobutylene tereph-thalate
Inherent viscosity=0.28

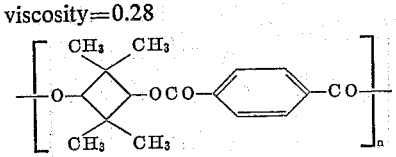

(J) Poly-2,2-dimethyl-1,3 - propylene - 1,4 - cyclohexane-dicarboxylate
Inherent viscosity=0.43

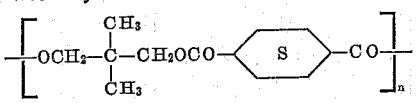

(K) Poly-2,2-dimethyl-1,3-propylene terephthalate
Inherent viscosity=0.73

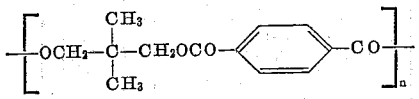

(L) Poly-2,2-diethyl-1,3-propylene - 1,4 - cyclohexanedi-carboxylate
Inherent viscosity=0.63

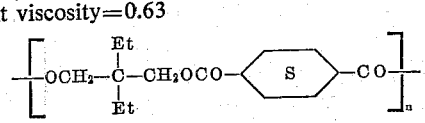

(M) Polyethylene terephthalate
Inherent viscosity=0.65

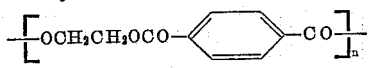

(N) Copoly

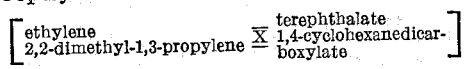

Inherent viscosity=0.57
(O) Polyethylene sebacate

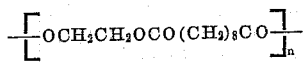

Inherent viscosity=0.37

Polymers A–L are sterically-hindered polyesters which were used to modify the base polyethylene terephthalate (M). Polymer O is an unsterically-hindered polyester. Polymer N is a copolyester containing a random arrangement of the four possible repeat units with 85 wt. percent of these units consisting of ethylenedioxy and terephthaloyl groups.

Segmented or block copolyesters were prepared by melt blending solid polyester particles of polymers A–K and O each with polyethylene terephthalate (M). In each instance 1.5 g. of the modifying polyester was mixed with 8.5 g. of polyethylene terephthalate in a 100 ml. glass flask fitted with a stainless steel stirrer and provisions for maintaining a nitrogen atmosphere. The flask was immersed in a heating bath maintained at 285° C. The polyester particles melted in about two minutes and thereafter the melt was stirred in a nitrogen atmosphere for a total of 30 min. at 285° C. This melt blending operation may also be carried out under high vacuum rather than at atmospheric pressure in a nitrogen atmosphere.

The blended melt was cooled; the resulting solid was ground to a particle size of less than 0.03 in.; and the crystalline melting point was determined by differential thermal analysis. The procedure for determining crystalline melting points of polymers by differential thermal analysis (DTA) is described in Tex. Res. J., 30, 624 (1960).

The melting point data are given in the following table. Two runs are included which were the same as described above except that 3 g. of the modifying polyester (K and L) were mixed with 7 g. of polyethylene terephthalate to make a segmented polyester containing 30 wt. percent of the modifying agent.

In measuring the melting points, the polymers were heated to 270° and held at 270° C. in the molten state for one hour; whereupon, they were cooled and then remelted to see if there was a big drop in melting point due to randomization through ester interchange. The initial melting point is given in column 2 and the recycle melting point is given in column 3.

| Example No. | Polymer Composition | Initial Melting Point, ° C. | Recycle Melting Point, ° C. |
| --- | --- | --- | --- |
| 1 | M | 255 | 260 |
| 2 | M+15% O | 224 | 228 |
| 3 | N | 203 | 207 |
| 4 | M+15% A | 255 | 258 |
| 5 | M+15% B | 257 | 258 |
| 6 | M+15% C | 256 | 255 |
| 7 | M+15% D | 256 | 256 |
| 8 | M+15% E1 | 256 | 250 |
| 9 | M+15% E2 | 257 | 249 |
| 10 | M+15% F | 256 | 256 |
| 11 | M+15% G | 252 | 248 |
| 12 | M+15% H | 257 | 256 |
| 13 | M+15% I | 257 | 254 |
| 14 | M+15% J | 257 | 258 |
| 15 | M+15% K | 254 | 248 |
| 16 | M+30% K | 254 | 251 |
| 17 | M+30% L | 250 | 251 |

The higher melting point sometimes obtained on the recycle is due to the annealing process on slow cooling. This produces a more perfect crystalline structure which on remelting gives a slightly higher crystalline melting point.

The data in the preceding table show that the sterically-hindered polyesters are resistant to ester interchange and tend to retain their configuration on melt blending with linear, crystalline polyesters such as polyethylene terephthalate. By contrast, the unsterically-hindered polyester (O) rapidly interchanges with the polyethylene terephthalate segments to form a copolyester with a melting point tending toward the random copolyester. The advantageous thermal properties of these sterically-hindered segmented polyesters can be seen by comparing the melting point of (M+15% J) with that of N. Both contain 15% by weight of the 2,2-dimethyl-1,3-propylene-1,4-cyclohexanedicarboxylate component, but N is a random copolyester. The melting point of the segmented polyester (M+15% J) is only slightly lower than that of the unmodified polyethylene terephthalate (M).

This type of sterically-hindered segmented polyester can be held in the molten state for 30–90 min. or longer and still retain its segmented structure, as shown by retention of the high melting point. This time interval is long enough to allow the polyester to be processed in standard molding and spinning equipment used in the trade. Under the same conditions the mixtures of polyesters disclosed in the prior art rapidly interact to form low-melting, random copolymers.

The segmented polyesters dye readily with disperse dyes without the aid of a dyeing assistant or super atmospheric pressure. Since they also retain the thermal characteristics of the linear, crystalline homopolymer, this is a valuable combination of properties.

*Example 18*

A melt blend of 200 g. of the composition (M+15% J) was made as in Example 14 above by scaling up the previously described technique used on the 10 g. batch for differential thermal analysis. The only change was that the melt blending was carried out for 15 min. at atmospheric pressure and 15 min. at a reduced pressure of about 1 mm. mercury pressure. This polymer was melt spun and the properties of the fibers are compared with a polyethylene terephthalate control in the table below.

|  | Segmented Polyester (M+15% J) | Polyethylene terephthalate (M) |
|---|---|---|
| Polymer inherent viscosity | 0.69 | 0.65 |
| Yarn inherent viscosity | 0.53 | 0.53 |
| Tenacity, (g./d.) | 3.28 | 2.61 |
| Elongation (percent) | 4 | 4 |
| Elastic modulus (g./d.) | 88 | 81 |
| Bar-sticking temp. (° C.) | 200–204 | 213–118 |
| Flow point at .2 g./d. load (° C.) | 218 | 222 |

Socks were knitted from each of the above compositions and dyed with 3% of the disperse dye, Eastman Fast Blue B–GLF for 1 hr. at the boil without a dyeing assistant. A heavy shade of dyeing was obtained on the segmented polymer (M+15% J); whereas, a light to medium shade was obtained on the polyethylene terephthalate control.

Example 19

A mixture of 194 g. (1.0 mole) of dimethyl terephthalate and 124 g. (2.0 moles) of ethylene glycol was placed in a reaction vessel equipped with a stirrer, a short distillation column, and an inlet for dry, purified nitrogen. A solution of 0.05 g. of zinc acetate and 0.01 g. of titanium tetrabutoxide in 10 ml. of butyl alcohol was added as catalyst. The mixture was stirred at 210–220° C. in a stream of nitrogen until the methyl alcohol formed by trans-esterification was removed by distillation. The temperature was raised to 280° C. and 35 g. of hydroxypivalic polymer such as in (A) above was added (15% by weight of final polymer). Immediately thereafter, vacuum was applied for 10 minutes to remove the excess ethylene glycol and produce a prepolymer with an inherent viscosity of about 0.2–0.3. The vacuum was bled to nitrogen and the prepolymer was poured into water. It was then dried and ground to a particle size of 0.01 inch. The final stage of the polymerization was carried out by heating the powdered prepolymer with stirring at 240–245° C. under a vacuum of 0.2 mm. for five hours. The segmented copolyester thus formed had an inherent viscosity, as measured in a solvent mixture consisting of 60 parts phenol and 40 parts tetrachloroethane, of 0.76. The melting point, as determined under crossed nicols on the hot stage of a microscope, was 255–262° C. This segmented copolymer was melt spun into fibers. The melting point of the spun polymer was practically unchanged, showing that there had been relatively little ester interchange in the molten state during the time required for extrusion. Quite surprisingly, the yarn properties such as tenacity, elongation, sticking temperature, fabric stiffening temperature, elastic recovery, etc., were essentially the same as those of polyethylene terephthalate. Moreover, the yarn was much more receptive to dyes and could be dyed to deep shades with disperse dyes without carriers and at atmospheric pressure. The dyed yarn exhibited good wash and light fastness.

Similar results can be obtained by substituting the other homopolyesters encompassed by this invention in preparing the novel segmented copolyesters.

Example 20

By combining 30% by weight (based on total weight) of each of polymers B–J with polyethylene terephthalate, as described in Examples 4–14 there were obtained segmented copolyesters which gave elastic-type yarn and molded articles with high impact strength. The melting point of these polymers was in many cases about 240° C. and in many cases it was as high as 250° C. or higher as illustrated by Examples 16 and 17 hereinabove.

Although it has been found that employing the solid phase process is not essential, nevertheless, the polyesters formed by the solid phase process are somewhat different in structure from the polyesters prepared by the melt phase process. In the solid phase process the freedom of movement of the polymer molecules is restricted. This decreases the possibility of extensive ester interchange to the random copolymer stage. For example, using R and Q as representing repeating units, in a melt polymerization process where steric hindrance is absent there will be a random configuration such as –R–R–Q–R–Q–R–Q–Q–, etc. On the other hand, in the solid phase process of this invention a configuration is more readily achieved in which blocks of each species remain intact, for example, R–R–R–R–R–Q–Q–Q–, etc. This is enhanced due to the restricted movement permitted in the solid phase process. Thus the polyesters prepared by the solid phase process of this invention have a segmented structure as compared to the random structure of melt polymerized copolyesters where no steric hindrance is present.

According to the present invention the sterically hindered segmented structure results in polymers of surprisingly higher melting points, greater melt stability, and a surprisingly higher degree of crystallinity, as will be further illustrated in the following table. In the table, item d illustrates a random copolyester prepared from a monomer mixture in a manner substantially the same as that illustrated in various prior art references. A segmented copolyester is illustrated by item b which is Example 9 above. Item c (cf. Example 2) above which contains no steric hindrance, hence the structure is primarily random but admixed with some segments. The disclosure of prior art such as British Patent No. 610,140 is illustrative of prior art on this subject. See also Examples 4 and 5 of U.S. Patent No. 2,692,248 which are analogous to items c and d of the following table. The copolyester of item d (Example 21) was prepared by melt polymerization starting with a mixture of monomers prior to prepolymerization with final polymerization above the melting point of the mixture.

The high melting points of the segmented copolyester of item b shows that the structure is a block composition including two different polyester moieties. The high melting point is caused by the retention by the relatively high molecular weight modified component of its identity during the polymerization with a minimum of ester interchange. The blocks of the modifying components consist of only a small molecular fraction of the final polymer. The use of such sterically hindered blocks prevents fast randomization by ester interchange on future processing in the molten state. The structure of the item a homopolyester is obviously homogeneous. It is also obvious that the structure of the item d copolyester is random. As compared to the latter, the mixed structure illustrated by item c represents some improvement. However, the tremendous improvement illustrated by item b was quite unexpectedly great.

| Item No. | Example No. | Polymer Composition | Linear Structure | Initial Melting Point, ° C. | Recycle Melting Point, ° C. |
|---|---|---|---|---|---|
| a | 1 | M | Homogeneous | 255 | 260 |
| b | 9 | M+15% E2 | Segmented | 257 | 249 |
| c | 2 | M+15% O | Mixed | 224 | 228 |
| d | 21 | M+15% E2 | Random | 207 | 214 |

The invention has been described in detail with particular reference to preferred embodiments thereof, but it will be understood that variations and modifications can be effected within the spirit and scope of the invention as described hereinabove and as defined in the appended claims.

We claim:
1. A segmented linear condensation-type copolyester melting between about 240° C. and 265° C. having a molecular weight of at least about 10,000 and having a segmented structure essentially composed of from about 95 to 60 percent by weight of hard segments and from about 5 to 40% by weight of soft segments in alternating sequence connected by ester linkages, said hard segments being composed of polyethylene terephthalate having an average molecular weight of at least 4,000 up to about 40,000 and said soft segments being composed of a homopolyester having an average molecular weight of about 1,500 up to about 25,000, said homopolyester being composed of at least one sterically hindered constituent, said constituents of said homopolyester being selected from the group of polyester constituents consisting of

(1) $HO-(CH_2)_r-X-(CH_2)_r-OH$
(2) $HO-OC-Y-CO-OH$, and
(3) $HO-CH_2-Z-CO-OH$ where $r$ is from zero to 1 and wherein X, Y and Z each represents a divalent organic radical containing from 1 to 40 carbon atoms, from zero to 4 chlorine atom substitutents, from zero to 4 bromine atom substituents, from zero to 20 oxygen atoms present as ether linkages and sufficient hydrogen atoms to provide a radical free from acyclic ethylenic unsaturation, the dilavent radical of said sterically hindered constituent being selected from the group consisting of the following radicals:

(a) 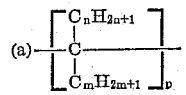

where each of $m$, $n$ and $p$ is from 1 to 4,
(b) a cycloalkylene radical containing from 5 to 10 carbon atoms in the carbocyclic ring having from zero to one unsaturated linkage between the nuclear carbon atoms,
(c) a bicycloheptylene radical having from zero to one unsaturated linkage between the nuclear carbon atoms, said segmented copolyester being characterized by having a melting point within about 20° C. of the melting point of a homopolyester of the hard segment having a molecular weight above 10,000, and further characterized by being so stable in its molten form that after one hour the melting point has not decreased by more than 15° C. and is not less than about 235° C.

2. A segmented copolyester as defined by claim 1 wherein the soft segments are composed of poly-1,2-cyclohexylenedimethylene terephthalate.

3. A segmented copolyester as defined by claim 1 wherein the soft segments are composed of poly-2,2-dimethyl-1,3-propylene terephthalate.

4. A segmented copolyester as defined by claim 1 wherein the soft segments are composed of polypivalolactone.

5. A segmented copolyester as defined by claim 1 wherein the soft segments are composed of poly-2,2-dimethyl-1,3-propylene-2,2-dimethylmalonate.

6. A segmented copolyester as defined by claim 1 wherein the soft segments are composed of poly-2-methyl-2-ethyl-1,3-propylene-norcamphane-2,5-dicarboxylate.

7. A segmented copolyester as defined by claim 1 wherein the soft segments are composed of poly-2,2-dimethyl-1,3-propylene-1,4-cyclohexanedicarboxylate.

8. A segmented copolyester as defined by claim 1 wherein the soft segments are composed of poly-2,2-diethyl-1,3-propylene-1,4-cyclohexanedicarboxylate.

9. A process for preparing a segmented linear condensation-type copolyester melting between about 240° C. and 265° C. comprising the following steps:
(A) forming a molten mixture of hard segment component (I) and soft segment component (II) as follows:
(I) from about 95 to 60% by weight of polyethylene terephthalate having an average molecular weight of from about 4,000 to about 100,000,
(II) from about 5 to 40% by weight of a homopolyester having an average molecular weight of about 1,500 up to about 25,000, said homopolyester being composed of at least one sterically hindered constituent, said constituents of said homopolyester being selected from the group of polyester constituents consisting of (1) $HO-(CH_2)_r-X-(CH_2)_r-OH$
(2) $HO-OC-Y-CO-OH$, and
(3) $HO-CH_2-Z-CO-OH$, where $r$ is from zero to 1 and wherein X, Y and Z each represents a divalent organic radical containing from 1 to 40 carbon atoms, from zero to 4 chlorine atom substituents, from zero to 4 bromine atoms substituents, from zero to 20 oxygen atoms present as ether linkages and sufficient hydrogen atoms to provide a radical free from acyclic ethylenic unsaturation, the divalent radical of said sterically hindered constituent being limited to the following radicals:

(a) 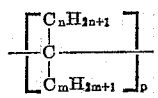

where each $m$, $n$ and $p$ is from 1 to 4,
(b) a cycloalkylene radical containing from 5 to 10 carbon atoms in the carbocyclic ring having from zero to one unsaturated linkage between the nuclear carbon atoms,
(c) a bicycloheptylene radical having from zero to one unsaturated linkage between the nuclear carbon atoms,
(B) heating said mixture at a temperature of from about 220° C. to about 300° C. until said segmented copolyester is formed, said segmented copolyester being characterized by having a melting point within about 20° C. of the melting point of a homopolyester of the hard segment having a molecular weight above 10,000, and further characterized by being so stable in its molten form that after one hour the melting point has not decreased by more than 15° C. and is not less than about 235° C.

10. A process as defined by claim 9 wherein said mixture (A) is cooled, formed into solid particles having average particle sizes of from about 0.05 to about $10^{-5}$ inch, and
(B) heating said particles of said mixture at a temperature of from about 220° C. up to about 5° C. below the sticking temperature of said particles until said segmented copolyester is formed.

11. Fibers of the segmented copolyesters as defined by claim 1.

12. A film of the segmented copolyesters as defined by claim 1.

References Cited
UNITED STATES PATENTS

| | | | |
|---|---|---|---|
| 2,623,031 | 12/1952 | Snyder | 260—860 |
| 2,692,248 | 10/1954 | Lincoln | 260—860 |
| 2,901,466 | 8/1959 | Kibler et al. | 260—75 |
| 3,037,960 | 6/1962 | Frazer | 260—860 |
| 3,194,791 | 7/1965 | Wilson et al. | 260—75 |
| 3,249,652 | 5/1966 | Quisenberry | 260—860 |

FOREIGN PATENTS

| | | |
|---|---|---|
| 673,066 | 6/1952 | Great Britain. |
| 1,303,888 | 8/1962 | France. |

MURRAY TILLMAN, *Primary Examiner.*

J. T. GOOLKASIAN, *Assistant Examiner.*